Jan. 10, 1967  K. E. ERICKSON  3,297,390
OPTICAL SIGHTING INSTRUMENT UTILIZING TWO
ANNULAR CONICAL REFLECTING SURFACES
Filed Nov. 5, 1962  4 Sheets-Sheet 1

KENT E. ERICKSON
INVENTOR

BY Walter G. Finch
ATTORNEY

KENT E. ERICKSON
INVENTOR

BY Walter G. Finch
ATTORNEY

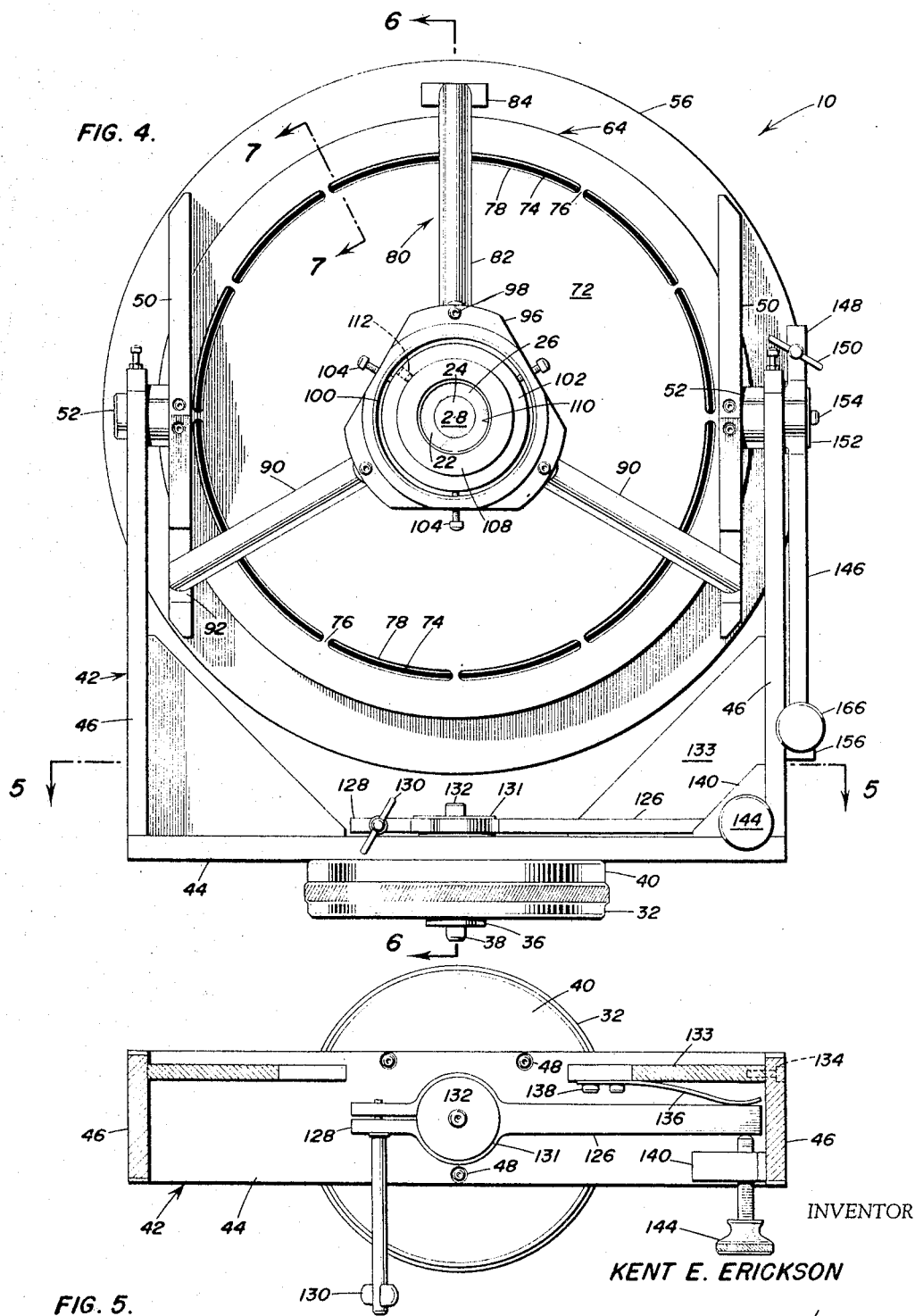

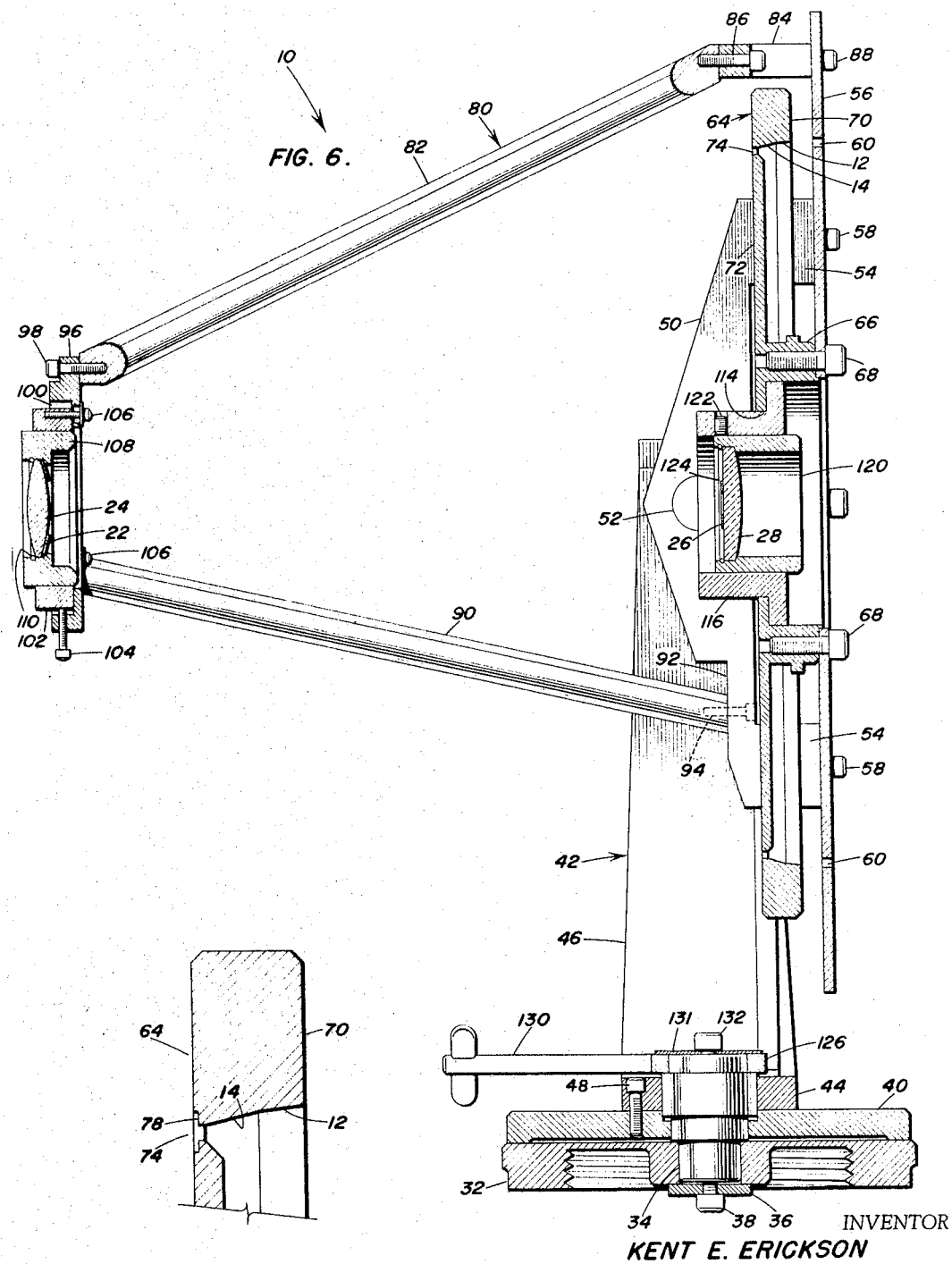

United States Patent Office 3,297,390
Patented Jan. 10, 1967

3,297,390
OPTICAL SIGHTING INSTRUMENT UTILIZING TWO ANNULAR CONICAL REFLECTING SURFACES
Kent E. Erickson, Ridgewood, N.J., assignor of fifty percent to Walter G. Finch, Baltimore, Md.
Filed Nov. 5, 1962, Ser. No. 235,339
3 Claims. (Cl. 350—55)

This invention relates generally to optical devices, and more particularly it pertains to a sighting instrument.

In a concave reflector normally only that portion of the surface is used which lies behind the focal plane. If that portion lying in front of the focal plane is used, the aberrations from a single reflection are very large. In fact, only for points very close to the axis of symmetry is there any imaging at all, and the system becomes effectively a variety of axicon. See articles by J. H. McLeod in Journal of the Optical Society of America, vol. 44, 592 and vol. 50, 166. Under these circumstances, the notion of a focal plane is no longer useful.

If, however, two (or an even number of) successive reflections are used, the aberrations can be reduced to give a usable field of view. If only a small annular zone of the incoming wave front is used, the depth of focus is still very large. By use of a multiplicity of concentric zones, each with two (or an even number of) successive reflections, an optical element can be constructed having many of the properties of a lens.

A principal object of this invention is to provide achromatic optics of very large aperture and high efficiency, yet of such light construction that they may be subject to bending.

A further object of this invention is to provide optics suitable for use in solar furnaces, thus making a heliostat unnecessary and placing the focus in a more convenient location than is obtained with the usual arrangements of mirrors.

A further object of this invention is to provide very large optical elements which can be prefabricated from smaller parts without suffering from such severe problems of alignment and surface tolerances as are encountered in the use of ordinary mosaic reflectors.

A further object of this invention is to provide focusing which use reflection at near-grazing incidence so that reflectivity will be relatively high for short wavelengths and for reflecting surfaces that are not of very good optical quality.

An object of this invention, therefore, is to provide a sighting instrument with a large field of view which is achromatic and useful at near-grazing incidence even in the X-ray region.

Another object of this invention is to provide a sighting instrument having the resolution of large aperture optics and depth of focus of small aperture optics.

Yet another object of this invention is to provide a sighting instrument of high accuracy whose reflective surface need be of only ordinary quality.

Still another object of this invention is to provide a large diameter sighting instrument which is rugged, light-weight, and easily manufactured, and which can be adapted to focusing ultraviolet stellar radiation for satellite astronomy.

These and other objects and attendant advantages of this invention will become more readily apparent and understood from the following detailed specification and accompanying drawings in which:

FIG. 4 is a rear elevation of the sighting instrument of FIG. 2;

FIG. 5 is a view taken along the line 5—5 in FIG. 4;

FIG. 6 is an enlarged vertical section taken on line 6—6 of FIG. 4; and

FIG. 7 is an enlarged detail view taken on line 7—7 of FIG. 4.

Figures 1, 2:
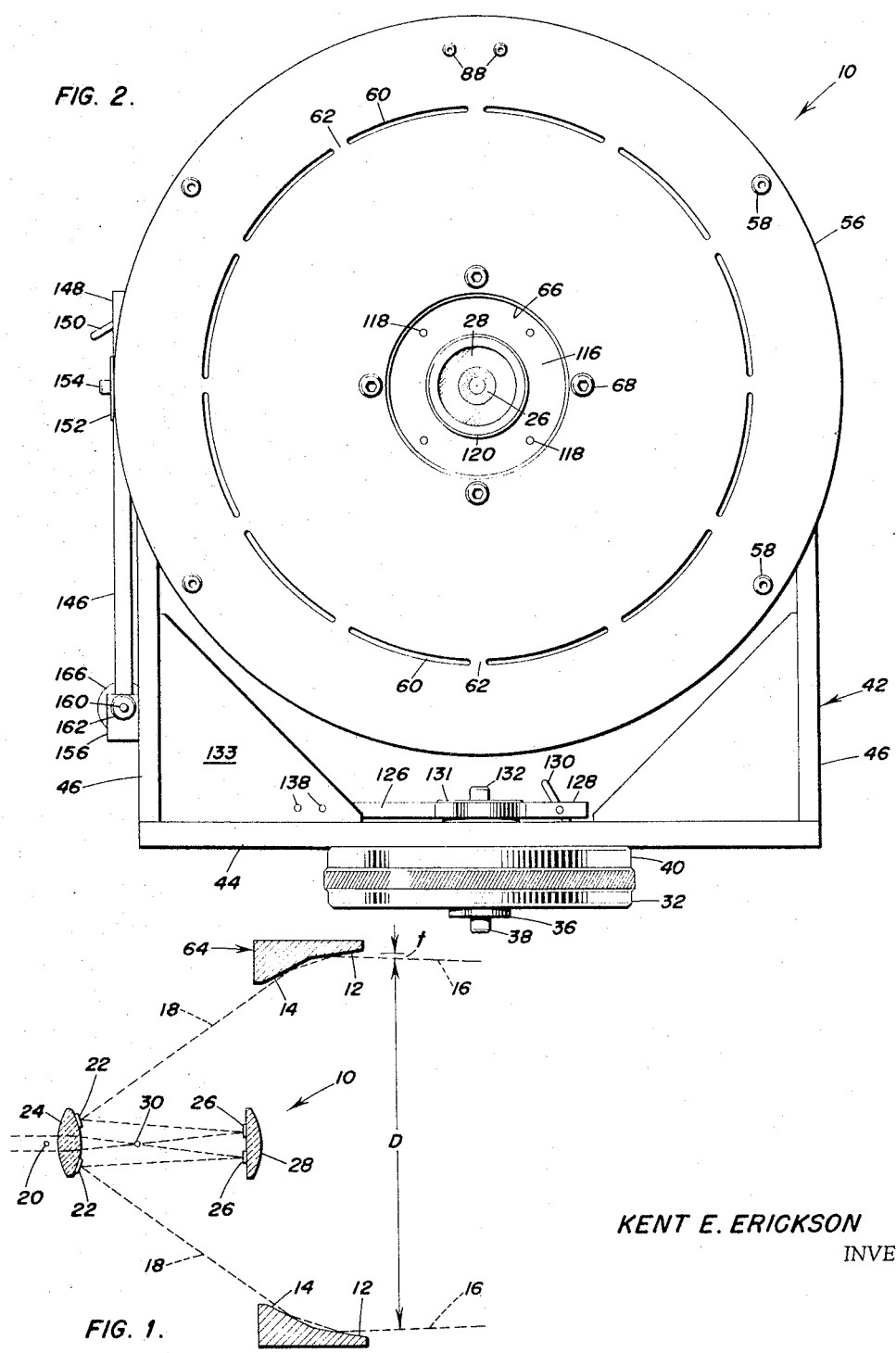
FIG. 1 is a schematic diagram illustrating the principle of the invention.
FIG. 2 is a front elevation of a sighting instrument incorporating features of this invention.

Referring now to the details of the drawings, the principle of the improved sighting instrument 10 is shown in FIG. 1. The incoming light 16 (assumed to originate from a point source remote from the drawing to the right) suffers two successive reflections from a pair of coaxial surfaces of revolution, namely reflective conical surfaces 12 and 14 of a reflecting plate 64. These surfaces 12 and 14 accept rays in succession named from an annular zone of diameter D and thickness $t$ of the incoming wave front of light 16.

The twice-reflected rays form a steeply converging hollow cone of rays 18 which would form an image of the source if allowed to converge at a point 20. The resolution of the instrument is theoretically greater than that for a lens of diameter D. Considerable magnification is thus required to enable the eye to resolve the detail in the image. This magnification is provided in two stages.

The first magnification is provided by a reflection from an annular aluminized zone 22 on the convex front surface of a double convex eye lens 24. After another reflection from an annular aluminized zone 26 on the rear plane face of a plane-convex finder lens 28, a real image is formed at point 30.

The second magnification is obtained by viewing this image through the previously mentioned eye lens 24. A crosshair reticule (not shown) small enough not to interfere with the cone or rays passing from annular zone 22 to annular zone 26 is placed to intersect at point 30. This sighting aid reticule may be mounted on three narrow strips radiating to the tripod frame structure to be described in connection with FIG. 6.

In the construction to be described, it happens that surfaces 12 and 14 are so narrow that it makes no essential difference that conical rather than parabolic or hyperbolic sections are employed. The use of a narrow annular portion $t$ of the wave front of incoming light 16 greatly increases the depth of focus. It reduces the intensity, however, and enhances the secondary maxima in the Airy diffraction pattern. For this reason the instrument is best used for sighting at small bright objects. The large depth of focus and large aperture give it the advantages of an axicon for aligning points. It is to be noted that the width $t$ may be increased at the expense of increasing off-axis aberrations.

As shown in FIGS. 2, 3, 4, and 6, the sighting instrument 10 is mounted upon a threaded mounting plate 32 such as employed with a tripod of a transit theodolite. This mounting plate 32 carries an axially vertical shaft 34 made stationary therewith by a washer 36 and capscrew 38.

A turntable 40 is rotatably mounted upon shaft 34 and bears against the top of the mounting plate 32. A supporting frame 42 consisting of a base plate 44 and vertical side legs 46 is mounted upon the top of the turntable 40. The side legs 46 are rigidly attached to the base plate 44 with corner gussets 133 secured by recessed capscrews 134 as shown best in FIG. 5.

A pair of horizontal stub shafts 52 on a co-extensive axis are journalled in the upper ends of side arms 46 and carry a mounting bridge 50 secured to the inner end of each.

A large flat disc-shaped face plate 56 is mounted with capscrews 58 upon sideward projecting ends 54 of the mounting bridges 50. An annular light transmitting aperture or interrupted arcuate slot 60 of large diameter which is used to minimize stray light is machined through and on a radius of face plate 56 keeping the interruption ribs 62 as few in number and as narrow as structural strength permits.

The reflecting plate 64 previously mentioned in connection with FIG. 1 is mounted axially centered on and spaced from the face plate 56 by means of a hollow central flange 66 and a ring of capscrews 68. The peripheral flange of reflecting plate 64 carries the two reflective conical surfaces 12 and 14 (shown enlarged in FIG. 7) spaced directly behind the arcuate slot 60.

A light transmitting annular passage or interrupted arcuate slot 74 contiguous with surface 14 pierces the web 72 of reflecting plate 64 as best shown in FIG. 4. The same cautionary note with regard to the interrupted ribs 62 is desirably observed with the present ribs 76 which segment the slot 74.

A tripod 80 having an upper arm 82 and two lower arms 90 extends to the rear of the plates 56 and 64. The upper arm 82 is secured to a U-shaped mounting block 84 with a capscrew 86 and the block 84, in turn, to the face plate 56 by a capscrew 88 as best shown in FIG. 6. The lower arms 90 secure to notches 92 in the bridges 50 with capscrews 94.

A triangular lens mounting frame 96 is secured by capscrews 98 to the converging ends of the tripod arms 80 and 90. The previously mentioned eye lens 24 is mounted, aluminized zone 22 inward, with a snapring 110 in a lens ring 108.

The lens ring 108 is slidably mounted and secured by a setscrew 112 within a floating ring 102. Ring 102 is movably retained by screws 106 in a counterbore 100 of the mounting frame 96.

Three spaced aligning screws 104 in the latter allow eye lens 24 to be accurately centered upon the optical axis of the sighting instrument 10 as defined by points 20 and 30 of FIG. 1.

The finder lens 28, positioned with its annular aluminized zone 26 facing eye lens 24, is mounted with a snapring 124 in a lens ring 120. The lens ring 120 is slidably mounted and secured by a setscrew 122 in a flanged sleeve 116.

This flanged sleeve 116 is secured in a central aperture 114 of the reflecting plate 64 by capscrews 118 as shown in FIGS. 2 and 6.

The sighting instrument 10 is provided with horizontal and vertical fine adjustment arms 126 and 146, respectively, which become effective after clamping thumbscrews 130 and 150 are tightened.

As best shown in FIGS. 5 and 6, the horizontal fine adjustment arm 126 embraces the upper end of shaft 34 and is captivated thereon by a washer 131 and capscrew 132. The arm 128 is split at this end, and this bifurcated end 128 is threaded and fitted with the thumbscrew 130.

With the thumbscrew 130 tightened after a coarse azimuth sighting is made, the fine rotation of the supporting frame 42 about shaft 34 is accomplished by a thumbscrew 144 which bears against the long end of fine adjustment arm 126. The thumbscrew 144 is threaded into a triangular block 140 spaced from one gusset 133 and scured to adjacent side leg 46 with capscrew 142.

A leaf spring 136 is secured to the gusset 133 by capscrews 138 and bears against the adjustment arm 126 at a point opposite to that contacted by thumbscrew 144.

Figure 3:
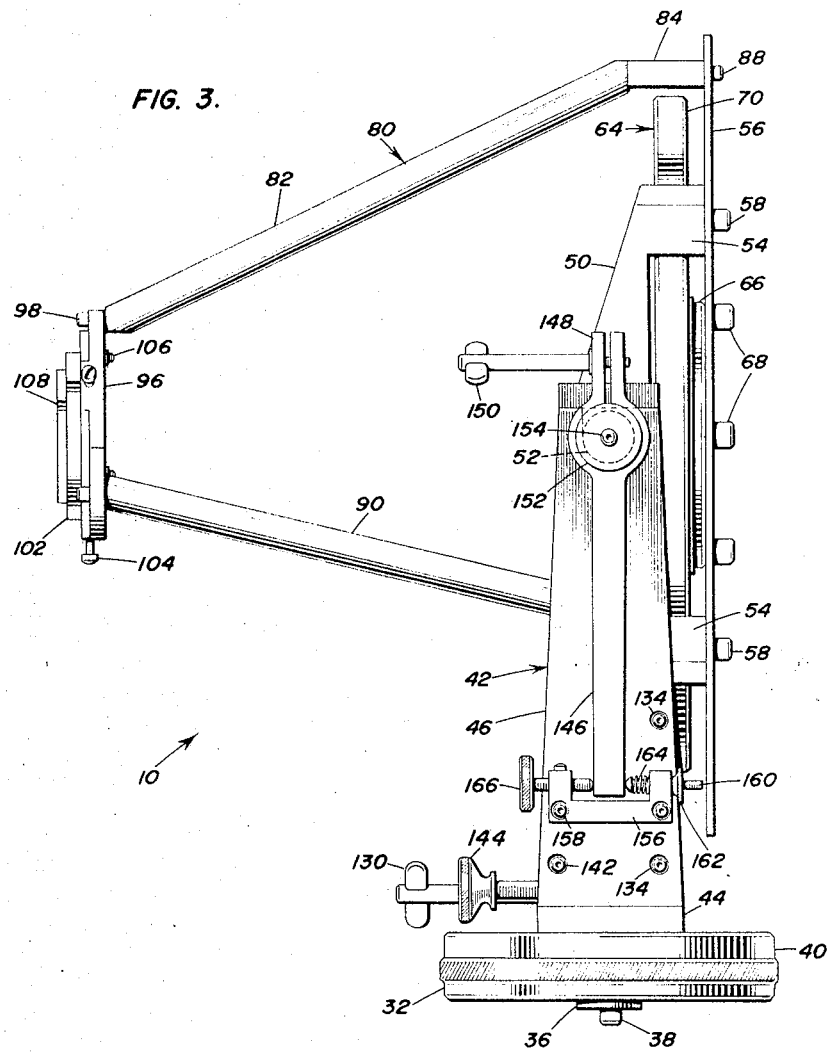
FIG. 3 is a side elevation of the sighting instrument shown in FIG. 2.

As shown best in FIG. 3, with the thumbscrew 150 tightened after a coarse elevation sighting, the fine rotation of the bridges 50 and associated structure about stub shafts 52 is accomplished by a thumbscrew 166 bearing against the long end of the vertical fine adjustment arm 146. The opposite end of the latter has a bifurcated end 148 which embraces one of the stub shafts 52 and is captured thereon with a washer 152 and capscrew 154. The bifurcated end 148 is threaded and fitted with the clamping thumbscrew 150.

A U-shaped block 156 secured to one side leg 46 of the supporting frame 42 with recessed setscrews 158 mounts the fine adjustment thumbscrew 166 so as to oppose the thrust of a compression coiled spring 164 against arm 146. This spring 164 is mounted on a guide pin 160 which carries a small adjusting thumbnut 162 and is set into the block 156 at the far side thereof from thumbscrew 166.

Obviously many modifications and variations of the present invention are possible in light of the above teachings. It is, therefore, to be understood that within the scope of the appended claims the invention may be practiced otherwise than as specifically described.

What is claimed is:

1. A sighting system comprising a first annular conical surface for receiving and reflecting radiation from a remote source, a face plate having an annular aperture for blocking the central portion of said radiation from said first conical surface, whereby the radiation reflected by said first conical surface is in the form of a hollow cone of radiation, a second annular conical surface of smaller diameter than said first annular conical surface coaxially positioned with said first conical surface and in the direction away from said source of radiation for receiving said hollow cone of radiation and reflecting it to a focal point, a first lens having an annular reflecting zone for intercepting the reflected hollow cone of radiation and reflecting it in converging fashion back towards said source of radiation, a second lens having an annular reflecting zone for intercepting the radiation reflected by said first lens and reflecting said radiation to a focal point between said first lens and said second lens to form a real image of said source of radiation, with said first lens serving as a magnifying eyepiece through the center of said reflecting zone thereon for viewing said real image under magnification.

2. The sighting system as recited in claim 1 wherein said first lens is a double convex lens.

3. The sighting system as recited in claim 2 wherein said second lens is a plano-convex lens having a planar surface facing said first lens.

References Cited by the Examiner

UNITED STATES PATENTS

| | | | |
|---|---|---|---|
| 804,996 | 11/1905 | Anthony | 88—57 |
| 1,981,492 | 11/1934 | Assmus | 88—84 X |
| 2,393,832 | 1/1946 | Stechbart. | |
| 2,703,506 | 3/1955 | Kelly | 88—57 X |
| 2,759,106 | 8/1956 | Walter | 88—57 X |
| 2,766,385 | 10/1956 | Herrnring et al. | 88—57 X |
| 2,915,940 | 12/1959 | Thomas et al. | 88—14 |
| 3,180,218 | 4/1965 | Durst | 88—57 |
| 3,200,253 | 8/1965 | Geier | 88—57 X |

FOREIGN PATENTS 437,444    10/1935    Great Britain.

DAVID H. RUBIN, *Primary Examiner.*

L. ORLOFF, J. G. BOLTEN, *Assistant Examiners.*